Aug. 13, 1929.   J. V. PUGH   1,724,312
WIRE SPOKE WHEEL BUILDING
Filed Jan. 28, 1928
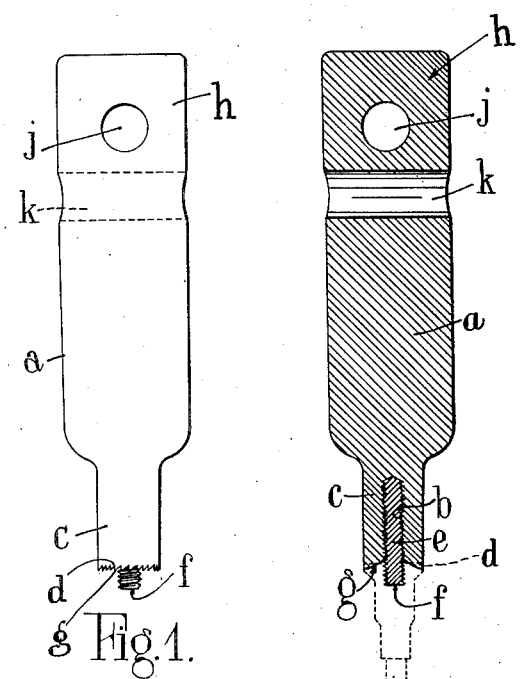

Patented Aug. 13, 1929.

1,724,312

UNITED STATES PATENT OFFICE.

JOHN VERNON PUGH, OF COVENTRY, ENGLAND, ASSIGNOR TO RUDGE-WHITWORTH, LIMITED, OF COVENTRY, ENGLAND.

WIRE-SPOKE-WHEEL BUILDING.

Application filed January 28, 1928, Serial No. 250,322, and in Great Britain January 31, 1927.

This invention relates to the building of wheels from a rim and hub which are connected together by a series of wire spokes which are tensioned to the necessary degree to afford the desired rigidity.

In wheel building of this kind as generally carried out the spokes are laced between the hub and the rim with no attempt to maintain more than an approximation to the correct relative positions and in fact with the stiffer spokes employed, for example in motor and motor bicycle wheels, considerable eccentric displacement of the hub is often necessary to pass the spoke ends into the holes in the rim through which, according to present practices, they generally project a short distance. After lacing and a rough tightening of the nipples the hubs are held in a stand while the wheel is revolved and the nipples tightened or loosened as the condition of the wheel may require until the rim runs true.

The foregoing occupies a considerable amount of time which adds to the cost of manufacturing the wheels and the present invention has for its main object the reduction of the time thus spent.

The invention consists in a wire spoke wheel building device in which a screw-threaded member having a projecting end adapted to afford a holding means for a nipple or the like temporarily screwed thereon has also surrounding the thread a sleeve, muff, boss or the like provided at the end adjacent the projection with a roughened or like annular face adapted to penetrate the adjacent face of the nipple and during continued screwing-up movement to impart rotation thereto.

The invention also consists in improved apparatus for building wire spoke wheels as hereinafter described.

The accompanying drawings illustrate a wheel-building or spoke-tensioning device in accordance with the invention:—

Figure 1 being an outside view;
Figure 2 a section, and
Figure 3 an end view.

In carrying the invention into effect in one convenient form there may be employed a suitable holding means or chuck for holding the hub shell and wheel rim in their correct relative positions as for example a mandrel adapted to hold the outer hub shell of a detachable wheel and means for holding the rim circular and concentric with the axis of the hub mandrel.

With the rim in position in any suitable holding means a hub shell, conveniently having the inner rows of spokes already threaded therein, may be placed in position say upon a mandrel or other device, the spokes being for example of such a length that they do not project through the holes in the rim or at any rate do not project to an extent which would in any way impede the positioning of the hub part say upon a mandrel or otherwise holding the same. The outer rows of spokes can then be positioned through the open end of the hub shell or all the spokes may be positioned in any convenient way and the holding means if employed be adjusted to firmly hold a hub concentric with a rim while the spokes are being subjected to the necessary tensioning.

For placing the nipples upon the ends of the spokes and exerting the necessary tension on the spokes, a tool as shown in the accompanying drawings is provided comprising a short rotatable shaft $a$ having a reduced boss provided with a coaxial cylindrical aperture $b$ forming at its outer end a sleeve, muff or the like $c$ which upon its outer annular side or end is provided with a series of sharp projections which may take the form of face ratchet teeth $d$ or may be of any other form to effect the necessary penetration. This sleeve has fastened in it a spindle $e$ which may be screwed therein and the screwed spindle end $f$ projects a short distance beyond the roughened or like annular face $g$ of the sleeve, the screw thread being adapted to enter the tapped holes of the nipples. The sharp projections $d$ of the sleeve $c$ are so formed that when a nipple is screwed up upon the projection end $f$, the sharp edges will penetrate the end face of the nipple and form an efficient driving means for screwing the nipple on to a spoke.

The sleeve portion $c$ of the spindle is adapted to exert any desired turning moment upon the nipples by a holder or enlarged part $h$ within which are holes $j$, $k$ for a turning bar (not shown).

The method of using the nipple holding and turning device $a$ is to mount a nipple (as shown in dotted lines) on the beforementioned screwed spindle end $f$ and after inserting the nipple through the hole in the wheel rim and entering it upon the end of the spoke, it is rotated by the operator grasping the before-mentioned holder $h$ and by means of a bar inserted in the holes $j$, $k$ turning the nipple in the direction for screwing it on to the spoke. When the desired tension has been reached it is rotated in the opposite direction and the spindle end $f$ is screwed out of the nipple which is left upon the spoke.

The tool may also be used without the central screwed piece $e$, by first screwing the nipple upon the spoke until the end of the spoke goes through and then engaging the end of the spoke by the tool and screwing up the nipple to the desired degree of tightness.

It is to be understood that the constructive details of the apparatus are given by way of example only and that the nipple holding and turning device may be formed in other way, for example the part $e$, $f$ being integral with the part $h$, and the part $c$ screwed thereon, or all three parts $e$, $c$ and $h$ may be separately formed and suitably joined together without in any way departing from the nature of this invention.

I claim:

1. A wire spoke wheel building device comprising a screw-threaded member having a projecting end adapted to afford a holding means for a wheel spoke nipple part temporarily screwed thereon, a boss-like region provided at the end adjacent the projection with a roughened or like annular face adapted to penetrate the adjacent face of the nipple during continued screwing-up movement and means for imparting rotation to said device.

2. A wire spoke wheel building device having in combination a screw-threaded cylindrical surface engaging a wheel spoke part for enforcing contact with a spoke nipple end surface, penetrating projections in the form of ratchet teeth provided on an annular face encircling said screw-threaded cylindrical surface and means for conjointly rotating said screw-threaded and ratchet tooth surfaces to effect rotation of said nipple.

In testimony whereof I have signed my name to this specification.

JOHN VERNON PUGH.